United States Patent Office 3,368,395
Patented Feb. 13, 1968

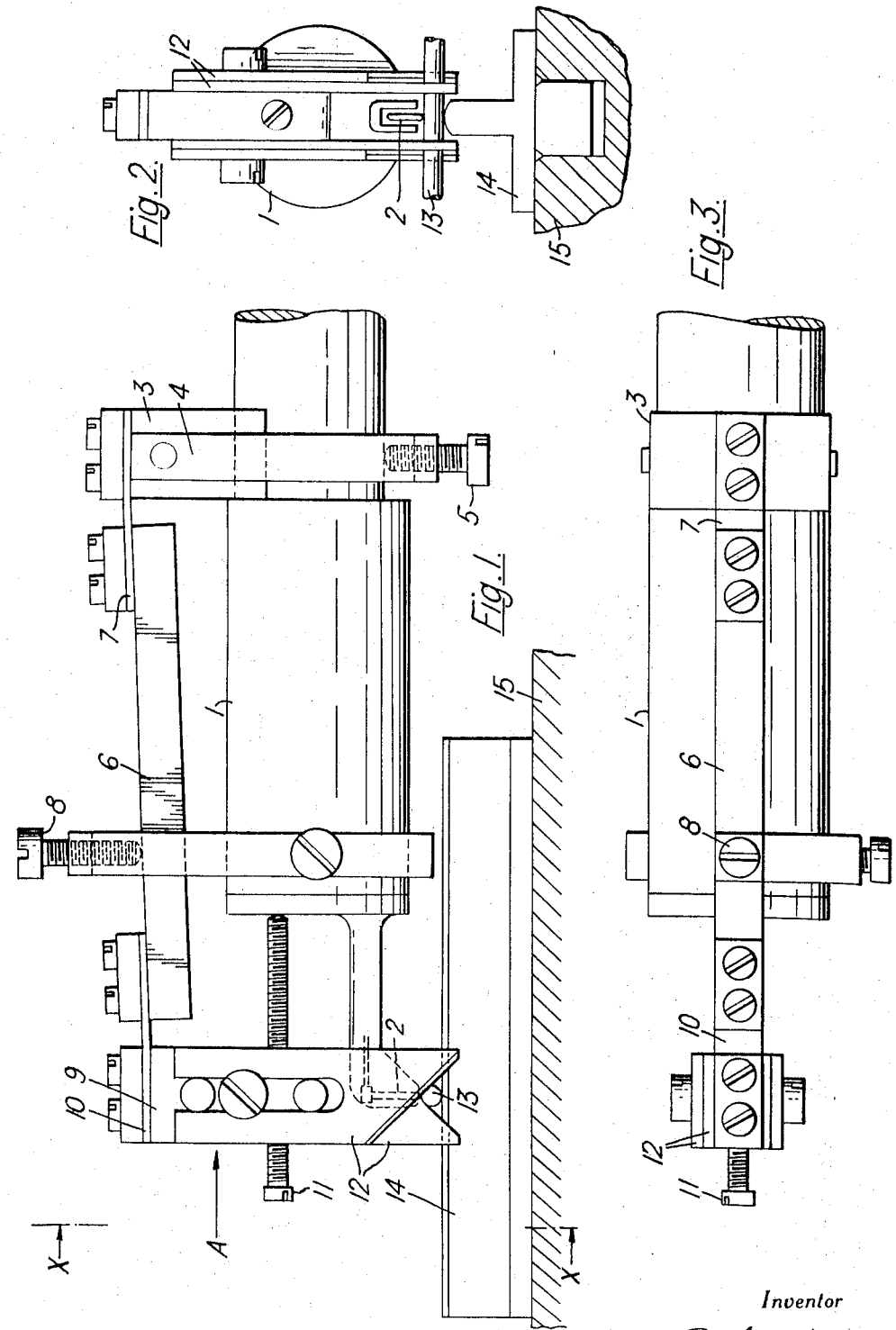

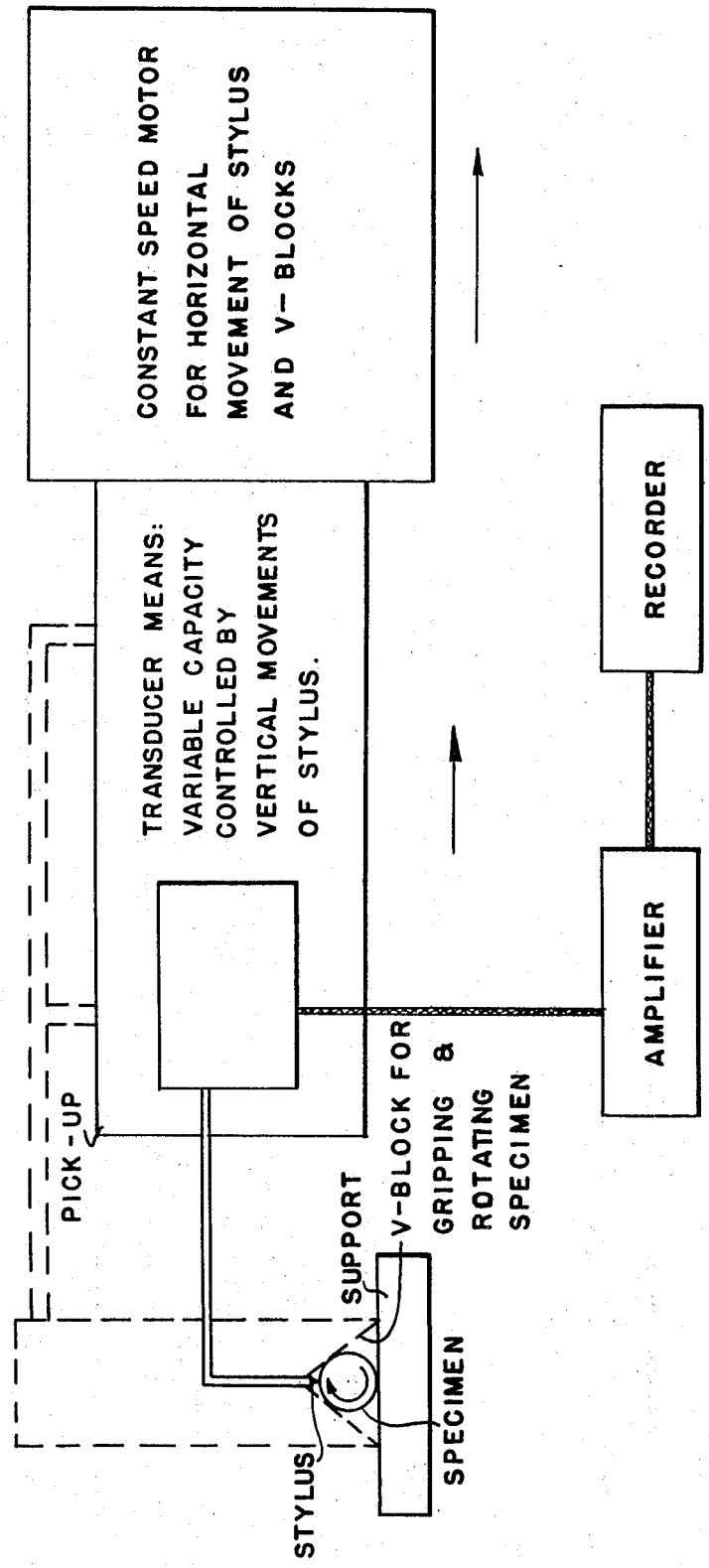

3,368,395
METHOD AND MACHINE FOR ASSESSING THE FINISH OF CYLINDRICAL SURFACE
Harry Richard Wright, Norton-on-Tees, England, assignor to Imperial Chemical Industries Limited, London, England, a corporation of Great Britain
Filed Apr. 5, 1965, Ser. No. 445,414
Claims priority, application Great Britain, Apr. 17, 1964, 16,026/64
8 Claims. (Cl. 73—105)

ABSTRACT OF THE DISCLOSURE

A method and apparatus is provided for testing circumferential surfaces of small diameter, cylindrical objects by rolling the cylindrical object over a support surface while sensing surface irregularities by a pick-up and transducing system which moves along with the rolling object and with the object rotating relative to the system.

*Brief description of invention*

This invention relates to improvements in methods and machines for assessing the surface finish of cylindrical surfaces along circumferential tracks, and in particular to improvements in surface measuring machines of the type wherein a pick-up having a stylus or feeler is traversed across the surface to be assessed, the up and down movements of the stylus being converted into corresponding changes in an electric current which are amplified and then used to control a graph recorder which provides a representation of the profile of a cross-section of the surface irregularities and, if desired, an average meter which shows the centre line average index of all irregularities coming within a standard length of surface.

An example of the desirability of such assessment is as follows: the fatigue strength of springs is considerably affected by the surface finish of the wire from which they are made, the principal defects therein being longitudinal scores, whose depth and shape can only be assessed by circumferential surface finish traces taken from specimens of the wire. Circumferential surface finish traces can be taken from cylindrical objects by means of known attachments to surface measuring machines of the type described, provided that the radius of curvature of the cylindrical surface is large enough to be accommodated by the attachments. In practice it has hitherto not been practicable to take surface finish traces from circumferential tracks having a radius of curvature less than 3/16 in.

The present invention, however, provides a method and device for taking circumferential surface traces from cylindrical objects of a wide range of diameters but which is particularly adapted to objects of small diameters.

The method according to the invention comprises the steps of positioning a cylindrical object under the stylus of the pick-up of a machine of the type described, and transverse to the direction of travel of the pick-up, upon a fixed support therefor, holding the object in posiiton upon the support by engaging it by downwardly-bearing load-applying means mounted on and adapted to move with the pick-up, and moving the pick-up so as to cause the object to roll in the same direction.

The invention also provides, in or for a machine of the type described, a device which comprises downwardly-bearing load-applying means mounted on and adapted to move with the pick-up, and a fixed support below the stylus for a cylindrical object positioned transversely thereupon, said load-applying means being adapted to engage and hold the object in position upon said support and, upon movement of the pick-up, to roll the object in the same direction.

One embodiment of the invention is hereinafter described with reference to the accompanying drawings, wherein:

FIG. 1 is a side elevation of the device according to the invention.
FIG. 2 is an end view along the line X—X of FIG. 1;
FIG. 3 is a plan view of FIG. 1; and
FIG. 4 is a schematic illustration of the system of the present invention.

*Detailed description of invention*

In the drawings there is shown the pick-up or probe 1 of a conventional surface contour measuring machine, having mounted therein a stylus or similar feeler 2, and which is adapted to move at a constant speed, in the direction shown by the arrow A, by means of a traversing mechanism (not illustrated). The device according to the invention is clamped on the pick-up 1 by means of a V-block 3, a yoke 4, and clamping screw 5. A square section rod 6 is hinged to the V-block 3 by a flat steel spring 7 which biases the rod 6 upwards relative to the pick-up 1. The rod 6 can be adjusted downwards by a screw 8. The head 9 of the device in hinged to the rod 6 by a second flat steel spring 10 which biases the head 9 towards the pick-up 1, adjustment of the head 9 away from the pick-up 1 being effected by an adjusting screw 11. Mounted on opposite sides of the head 9 are pairs of angled plates 12, the bottom end of each pair forming a V-notch, the sides of which are set at an angle to the horizontal, for example between about 30° and 60°, and preferably at about 45°, to the horizontal. If desired, each pair of angled plates 12 may be replaced by a single plate provided with a V-notch in its bottom end.

The specimen 13 whose surface is to be assessed is laid transversely to the direction of travel upon a fixed supporting rail 14 which is itself mounted on the machine table 15 immediately underneath the stylus and parallel to its direction of travel. The pick-up, with the device mounted thereon, is lowered on to the specimen 13 until the V-notches engage and bear down firmly upon the ends of the specimen which protrude on each side of the rail 14. Adjustment by means of screws 8 and 11 is now effected until the stylus point 2 is resting lightly on the top of the specimen. Adjustment is complete when the pen of the machine graph recorder (not illustrated) is central on its chart and further adjustment of screw 11 in either direction causes the pen to move towards the bottom edge of the chart.

When the machine's traversing mechanism is switched on, the pick-up 1 moves in the direction of the arrow A, the specimen 13 is simultaneously rolled in the same direction along the rail 14, and the stylus 2 follows the irregularities of the specimen's surface. The velocity of the specimen's surface relative to the stylus, at the point of contact therewith, is the same as the velocity of the stylus relative to the machine table; i.e. the velocity of the stylus relative to the specimen's surface is matched to the graph recorder and average meter which produce printed chart records and centre-line-average values of the circumferential tracks.

To ensure that the specimen rolls, rather than slides, along the rail 14, the friction between the specimen and the rail should be greater than the friction between the V-notches and the specimen, and the surface of the rail and the V-notches are formed accordingly. For example, the rail 14 may be covered with a thin strip of rubber, whereas a film of polytetrafluoroethylene, for example "Fluon" (Registered Trademark), may be interposed between each V-notch and the specimen.

Alternatively, "Fluon" sheet may be cut as V-notches which are located within the V-notches of the device, slightly proud of the metal edges and bearing down on the specimen. In operation, sliding of the specimen would be revealed by the appearance of short horizontal portions on the chart record; absence of sliding may be confirmed by measuring the length of chart record between repetitions of recognisable features.

When the chart records more than a complete circumference, it is usually evident that the path of the stylus 2 relative to the specimen 13 is a spiral with a very small helix angle, but this is normally of no practical significance. In order to obtain a truly circumferential track very careful alignment of the V-notches is required.

The machine according to the invention has been tested on a number of speciments of wire, whose diameters were in the range 0.375 in. to 0.036 in. (20 S.W.G.).

None of the lengths of wire, from which the test specimens were cut, were straight, and they were "straightened" as nearly as possibly by hand, or in the case of the thicker wires, by means of pliers and vice. Care was of course exercised to avoid damaging the surface in the region to be explored by the stylus. Thus none of the specimens was truly straight and the effects of "errors of straightness" were that the wire directly beneath the stylus moved vertically and horizontally relative to the V-notches and similarly, therefore, relative to the pick-up. These movements of the specimen relative to the pick-up introduced waviness characteristics in the chart record, the magnitude of the waves being greater in the case of the thinner specimens. They limited the magnification at which a chart record could be obtained, and limited the useful cut-off wave length, when obtaining centre-line-average values, to 0.01 in. In spite of the limitations imposed by the lack of "straightness" of the specimens, repeatable and useful results were obtained from these specimens. If larger or smaller specimens are to be assessed, this can be done by suitably altering the size or position of the V-notches.

The present invention is particularly advantageous in that it enables the surface roughness of cylindrical objects of a large range of diameters to be measured in a circumferential direction without requiring careful adjustment of the machine to suit the diameter of the objects; furthermore it enables such measurements to be taken of objects which are of too small diameter to be accommodated by known attachments to machines of the type described.

What is claimed is:

1. In a surface testing device of the type having a feeler means for sensing surface irregularities in a test specimen, together with means for transducing the sensed irregularities into electric current, the improvement comprising:
    a support for mounting a test specimen of circular cross-section in rolling contact therewith,
    means for positioning said feeler means in contact with said test specimen,
    means for moving said feeler relative to said support surface and for rotating said test specimen relative to said feeler means so that said specimen maintains rotating contact with said feeler means and rolling contact with said support,
    means for amplifying said electric current, and
    means for recording said amplified electric current as a representation of the profile of the surface of said test specimen.

2. A device as claimed in claim 1 and including a load-applying means which comprises a pair of V-notches adapted to engage opposite ends of a test specimen having opposite ends which protrude beyond each side of the support.

3. Device as claimed in claim 2, wherein said V-notches comprise a substance adapted to reduce friction between the V-notches and the test specimen.

4. Device as claimed in claim 3, wherein said substance is polytetrafluoroethylene.

5. Device as claimed in claim 1, wherein the upper surface of said support comprises a substance adapted to increase friction between said support and the test specimen.

6. Device as claimed in claim 5, wherein said substance is rubber.

7. In a method of assessing the circumferential surface finish of a small diameter cylindrical object by contacting the surface of the object with a pick-up and transducing system which detects irregularities in the surface finish and which translates the irregularities into a record of the profile of the surface, the improvement comprising the steps of:
    supporting the object to be tested on a support surface and contacting a pick-up with a surface portion of the object,
    rolling the object relative to the support surface and in a linear direction of movement, and
    moving the pick-up in the same linear direction and at the same rate of movement as the movement of the rolling object along the support surface, so that the object is rotated relative to the pick-up, and the surface finish of the object is assessed for a circumference of the object.

8. The method of claim 7 wherein the ends of the object protrude beyond each side of said support surface, and including the step of holding the object in place for rolling movement along the surface by downwardly-bearing load applying means which engage the protruding ends of the object.

References Cited

UNITED STATES PATENTS

| | | | |
|---|---|---|---|
| 2,372,415 | 3/1945 | Reason | 73—105 |
| 2,404,143 | 7/1946 | Reason | 73—105 |
| 2,491,016 | 12/1949 | Reason | 73—105 |
| 2,689,380 | 9/1954 | Tait | 156—306 |
| 2,742,993 | 4/1956 | Hommel et al. | 33—154 X |
| 3,208,272 | 9/1965 | Hall et al. | 73—105 |

RICHARD C. QUEISSER, *Primary Examiner.*

C. I. McCLELLAND, *Assistant Examiner.*